United States Patent Office 2,693,434
Patented Nov. 2, 1954

2,693,434

CRYSTALLIZED INSULIN PREPARATION AND PROCESS OF PREPARING SAME

Fritz Lindner, Frankfurt am Main Hochst, and Eugen Dörzbach, Frankfurt am Main Griesheim, Germany, assignors to Farbwerke Hoechst Aktiengesellschaft vormals Meister Lucius und Bruning, Frankfurt (Main), Germany, a German company No Drawing. Application March 27, 1951,
Serial No. 217,902

Claims priority, application Germany April 5, 1950

5 Claims. (Cl. 167—75)

The present invention relates to valuable and new crystalline preparations from the blood-sugar reducing hormone of the pancreas (insulin) and to a process of preparing them.

German patent specification No. 727,888 describes a process of preparing insulin products of a prolonged action. The process consists in reacting insulin with a compound of the quinoline series and acridine series, the bases of which, within a pH range of 6.5 and 9, are insoluble in water or only soluble to form a colloidal solution, and, if required, adjusting the solution to a pH range of 6.5 to 7.

By operating according to the process described in the afore-named German patent specification and causing insulin to react within a pH range of 6.5–7, a fine amorphous suspension is obtained which, in some cases, on storing, may tend to coagulation and can only with difficulty be uniformly suspended again by shaking. By the adjustment to a pH value of about 3.5, clear solutions may be obtained which, likewise, show a prolonged action and which have proved to be extremely valuable in therapy.

Now, we have found a process of preparing crystalline insulin preparations by reacting insulin with a compound of the acridine series and the quinoline series, the bases of which, at a pH range of 6.5 and 9, are either insoluble or only soluble to form a colloidal solution. During said reaction the products are caused to crystallize in the manner usual for the pure insulin.

Several methods are known for preparing pure crystalline insulin (compare Bomskov, "Methodik der Hormonforschung," vol. 1 (1937), page 676 et seq.). There is particularly referred to the method of Scott and Gerlough-Bates, according to which crystallized insulin can be obtained by means of acetone or propyl alcohol, while adding a phosphate buffer, and in the presence of small portions of zinc, cobalt, nickel or cadmium.

It is extremely surprising that it is possible to transform the reaction products of insulin and the compounds in question of the acridine series and quinoline series in the same manner into the crystalline form, just as it is possible with the pure insulin itself. The procedure may, for example, be as follows: An acid hormone solution is mixed with suitable buffer substances, such as phosphates or acetates; small portions of salts of zinc, cadmium, cobalt or nickel and organic, water-soluble solvents, such as alcohols or ketones, are added, and after the addition of the solutions of the acridine compounds or quinoline compounds the solution is adjusted to a pH range of about 5 and 6.5, preferably to a pH of about 6. On standing or—and this being better and more uniform—while stirring, the precipitated product which, at the beginning, is amorphous, is gradually transformed into well-shaped crystals which, by fractional sedimentation, may be freed and isolated from a small portion of amorphous particles. By varying the quantity of the metal salts and of the quinoline- or acridine compounds added, it is possible to influence within relatively large limits the content of these substances in the crystals.

It has been found that the crystals thus obtained are excellently suitable for the manufacture of hormone preparations showing a prolonged action if they are used in an aqueous suspension. Contrary to solutions of the hormone, suspensions of that kind, when having a neutral reaction, do not lose, on storing, anything of their potency; owing to their crystalline structure they have no tendency to coagulate; they can, therefore, be accurately dosed in a simple manner and are tolerated without causing any irritation.

According to the content of metal salts and of acridine compounds or quinoline compounds, the preparations obtained have a varying prolonged efficiency; it is, therefore, possible, to comply with the various requirements of the clinic and to adjust even severe cases of diabetes so that with one injection in the course of 24 hours they can be kept completely within the metabolic balance.

Furthermore, it has been found that for these crystalline preparations only a fraction of the content of acridine compounds or quinoline compounds is required for attaining the same prolonged action as it is noticed with the known preparations.

The following examples serve to illustrate the invention, but they are not intended to limit it thereto.

*Example 1*

800 milligrams of pure insulin are dissolved in water by the addition of a small quantity of hydrochloric acid and the solution obtained is made up to 200 cc. A solution of 36 milligrams of bis-2-methyl-4-amino-quinolyl-6-carbamide-hydrochloride in 20 cc. of water and 2 cc. of zinc chloride solution of 0.5 per cent strength is added and the insulin complex is then precipitated by adding a solution of 2.7 grams of primary potassium phosphate in water which has been diluted to 220 cc. and adjusted by means of caustic soda solution to a pH of 6.5. 50 cc. of isopropyl alcohol are immediately added and the solution is adjusted with 2/n hydrochloric acid to a pH range of 6 to 6.1. The whole is slowly stirred at room temperature until the precipitate has nearly completely been transformed into crystals. The crystals are centrifuged and freed, on the centrifuge, by fractional sedimentation, from small amounts of amorphous admixtures; they are then dried with acetone and ether.

About 700 milligrams of uniform crystals are obtained which have a content of 2.5 per cent. of bis-2-methyl-4-amino-quinolyl-6-carbamide. If 72 milligrams of that compound are added, instead of 36 milligrams of bis-2-methyl-4-amino-quinolyl-6-carbamide hydrochloride, crystals are obtained containing 4.5 per cent. of bis-2-methyl-4-amino-quinolyl-6-carbamide.

*Example 2*

5 grams of insulin are dissolved with hydrochloric acid and the solution is made up with water to 950 cc. A solution of 150 milligrams of bis-2-methyl-4-amino-quinolyl-6-carbamide hydrochloride in 50 cc. of water is then added. 1 liter of phosphate buffer (containing 16.8 grams of secondary sodium phosphate and 2.8 grams of primary potassium phosphate) which buffer previously has been acidified with 80 cc. of normal hydrochloric acid, 20 cc. of zinc chloride solution of 0.5 per cent. strength and 200 cc. of acetone are then added and the solution is adjusted with ammonia to a pH of about 5.8. On standing, the precipitate, which is amorphous at the beginning, is transformed into crystals which are worked up according to the process described in Example 1.

A product is obtained containing 1.5 per cent. of bis-2-methyl-4-amino-quinolyl-6-carbamide. If 300 milligrams of bis-2-methyl-4-amino-quinolyl-6-carbamide hydrochloride are used, a crystallized final product is obtained having a content of about 3 per cent. of bis-2-methyl-4-amino-quinolyl-6-carbamide.

A crystalline insulin product having the same content of bis-2-methyl-4-amino-quinolyl-6-carbamide is obtained by using a cobalt chloride solution of 1 per cent. strength, under otherwise the same conditions, instead of a zinc chloride solution of 0.5 per cent. strength.

*Example 3*

10 grams of insulin are dissolved in water by means of hydrochloric acid and the whole is made up to 1.1 liter. To the solution thus obtained 1.2 liters of phosphate buffer previously acidified with 96 cc. of normal hydrochloric acid, 24 cc. of zinc chloride solution of 0.5 per cent. strength, 240 cc. of acetone and a solution of 860 milligrams of bis-2-methyl-4-amino-quinolyl-6-carbamide hydrochloride in 100 cc. of water are then added. The solution is then adjusted with ammonia to a pH of 6.3 and further treated as it is described in Example 1.

8.5 grams of crystals are obtained containing about 3 per cent. of bis-2-methyl-4-amino-quinolyl-6-carbamide.

*Example 4*

1.25 grams of pure insulin are dissolved in water, while adding 2.5 cc. of normal hydrochloric acid and the solution is made up to 125 cc. A mixture of 150 cc. of phosphate buffer, 12 cc. of normal hydrochloric acid, 3 cc. of zinc chloride solution of 0.5 per cent. strength and 30 cc. of acetone, furthermore 54 milligrams of 2-ethoxy-6.9-diamino-acridine-lactate, dissolved in 15 cc. of water are added. The clear solution is adjusted with ammonia to a pH of about 6.8 and the whole is allowed to stand for 30 minutes. The solution is then adjusted back with normal hydrochloric acid to a pH of about 6.1 and slowly stirred at room temperature until the precipitate has been transformed nearly completely into small rounded-off crystals. They are centrifuged and further treated as it is described in Example 1. 1 gram of crystals of an intense lemon-yellow coloration is obtained. These crystals in an aqueous suspension show a considerably prolonged efficacy in comparison with normal crystalline insulin.

*Example 5*

1.25 grams of crystalline insulin are dissolved as described in Example 4 and the solution obtained is mixed with the same additions. Instead of the 2-ethoxy-6.9-diamino-acridine-lactate, a solution of 95 milligrams of 3.6 diamino-10-methyl-acridinium chloride in 15 cc. of water is added. The solution is then adjusted to a pH of about 6.9, allowed to stand for about 15 minutes and adjusted back by means of hydrochloric acid to a pH of about 6.2. The further treatment is the same as that described in Example 4. 1.23 grams of small, but well shaped crystals of a bright, golden-yellow coloration are obtained.

*Example 6*

1.25 grams of crystalline insulin are dissolved as described in Example 4 and to the solution obtained the additions usual for the crystallization are given. 120 milligrams of 2-betadiethyl-amino-ethoxy-6-acetamido-9-amino-acridinium acetate dissolved in a small quantity of water are then added and the solution is adjusted with ammonia to a pH of about 6.3. The crystals formed are worked up in the usual manner. Needle-shaped crystals of a lemon-yellow coloration are obtained in a yield of 0.8 gram. They are distinguished by a specially strong prolonged action.

*Example 7*

1.25 grams of crystalline insulin are dissolved as described in Example 4, and the solution obtained is caused to crystallize, while adding 108 milligrams of N,N'-di-(2-methyl)-4-amino-quinolyl-6-adipic acid-diamide hydrochloride, dissolved in a small quantity of water. 1.21 grams of rounded-off cubes are obtained, containing 3 per cent. of the base.

*Example 8*

1.25 grams of crystalline insulin are recrystallized as described in Example 7, but while adding 100 milligrams of N,N'-di-(2-methyl)-4-amino-quinolyl-6-cyanuric acid-diamide-dihydrochloride. 1.15 grams of rounded-off cubes are obtained containing 2.6 per cent. of the base and showing a distinctly improved prolonged action.

We claim:

1. The crystalline reaction product of insulin, bis-2-methyl-4-amino-quinolyl-6-carbamide and zinc.
2. An aqueous suspension of the crystalline reaction product of insulin, bis-2-methyl-4-amino-quinolyl-6-carbamide and zinc.
3. The process of preparing crystalline reaction products of insulin comprising the steps of reacting insulin with a water-soluble salt of bis-2-methyl-4-amino-quinolyl-6-carbamide in an aqueous solution containing buffer substances, a water-soluble organic solvent and a salt selected from the group consisting of salts of zinc, cadmium, cobalt and nickel, by adjusting the solution to a pH range of about 5 to 6.5 and allowing it to stand until the reaction product amorphous at the beginning has been transformed into crystals.
4. The process of preparing crystalline reaction products of insulin comprising the steps of reacting insulin with a water-soluble salt of bis-2-methyl-4-amino-quinolyl-6-carbamide in an aqueous solution containing an alkali metal phosphate as buffer substance, a water-soluble organic solvent, and a zinc salt, by adjusting the solution to a pH of about 6 and allowing it to stand until the reaction product amorphous at the beginning has been transformed into crystals.
5. A process as claimed in claim 4, wherein the crystallization is effected under stirring.

References Cited in the file of this patent

UNITED STATES PATENTS

| Number | Name | Date |
|---|---|---|
| 2,143,590 | Scott | Jan. 10, 1939 |
| 2,143,591 | Scott et al. | Jan. 10, 1939 |
| 2,538,018 | Krayenbuhl et al. | Jan. 16, 1951 |

FOREIGN PATENTS

| Number | Country | Date |
|---|---|---|
| 727,888 | Germany | Nov. 7, 1942 |
| 59,369 | Denmark | Jan. 5, 1942 |
| 53,577 | Netherlands | Dec. 15, 1942 |

OTHER REFERENCES

Scott in Biochemical Jour., vol. 28, pp. 1592–1603.